No. 677,497. Patented July 2, 1901.
J. A. BUCK.
HOOF PAD.
(Application filed Apr. 4, 1901.)
(No Model.)
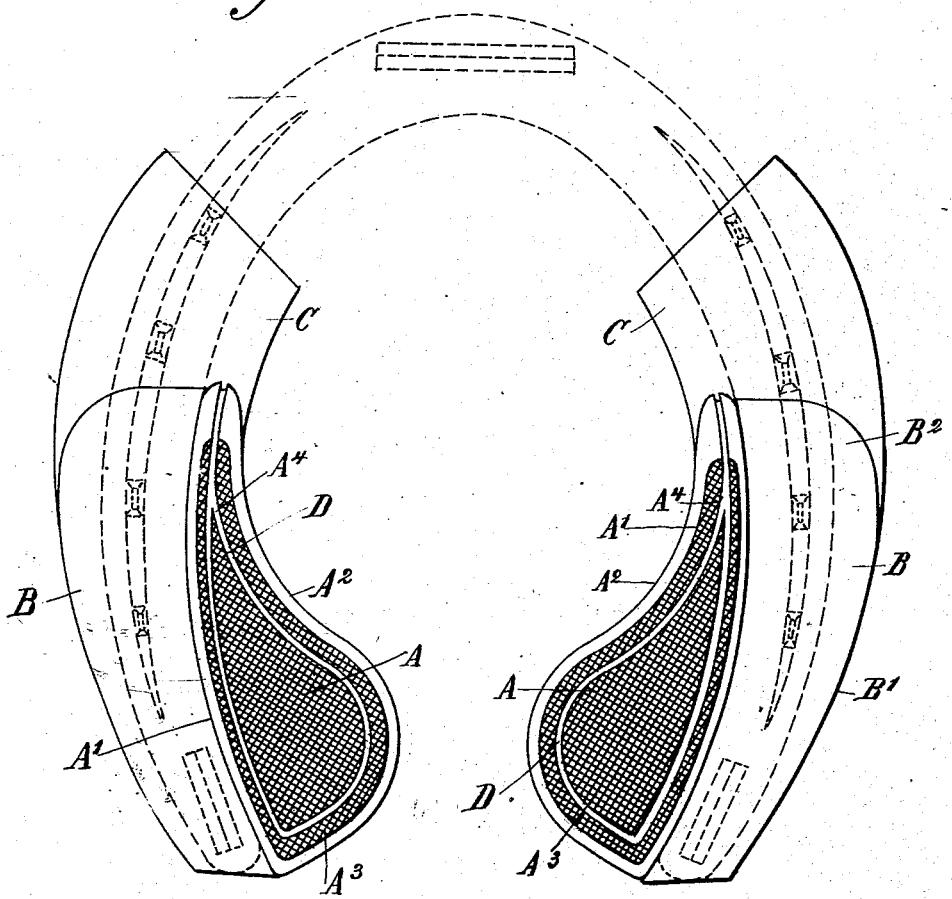
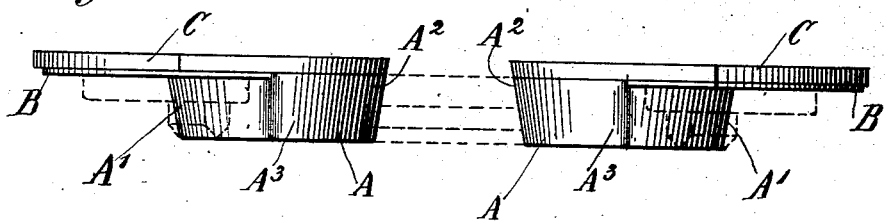

UNITED STATES PATENT OFFICE.

JOHN ANSON BUCK, OF BROOKLYN, NEW YORK.

HOOF-PAD.

SPECIFICATION forming part of Letters Patent No. 677,497, dated July 2, 1901.

Application filed April 4, 1901. Serial No. 54,246. (No model.)

*To all whom it may concern:*

Be it known that I, JOHN ANSON BUCK, a citizen of the United States, residing at Brooklyn, in the county of Kings and State of New York, have invented certain new and useful Improvements in Hoof-Pads, of which the following is a full and complete specification, such as will enable those skilled in the art to which it appertains to make and use the same.
This invention relates to that class of hoof-pads which are designed to prevent slipping of the horse through the instrumentality of interposed elastic pads between the frogs of the horse and the ground. Hitherto there have been provided hoof-pads extending wholly across the hoof and thickened centrally and at the rear; but these being continuous do not, particularly when rendered smooth by friction with the ground, prevent lateral slipping to the greatest extent and by covering up the hoof from one shoeing to the next prevent the free circulation of air and water and provide an unnatural environment for the hoof and render it unhealthy and constantly dirty and liable to disease.

The form of horseshoe embodying rubber heel-pieces inserted therein or formed thereon in the process of manufacture leaves the center of the hoof open to the circulation of air and also leaves a space between the pads, which is desirable in preventing lateral slipping; but the shoe must be especially constructed and applied to the hoof cold and shaped without heating, while the usual toe-calks cannot be secured thereto in weather requiring them. Moreover, each of these forms of soft-tread protection for the hoof is expensive, and even the cheapest pads or rubber-tread horseshoes are only to be so considered as compared with those still more costly and are an item of considerable expense compared to the normal or average way of shoeing horses with only a plain set of shoes.

It is the especial object of my invention to produce means operating as a horseshoe-pad which will present every practical and material advantage of any pad hitherto produced, which will shield the horse at the frog and provide yielding cushions thereat, which will leave the main portion of the hoof free and open, as health and cleanliness demand, which will give the horse from the toe clear back to each heel the full and solid support of the ordinary horseshoe, with the adaptability for the employment of the usual toe and heel calks when required, which can be instantly adjusted by any practical horseshoer without previous experience, which will fit any hoof whether of a large or small horse, and which, further and above all, will be radically cheap in construction, while yet strong and durable and capable of being used for more than one shoeing in the many cases where such is desirable and feasible.

My invention is distinguished over the present state of the art of hoof-pads and soft-tread horseshoes in that it consists, primarily, of two separate heel-pieces provided with means for fitting them directly to the inside of the rear ends or heels of the shoe and securing them by the nails which pass through the shoe, and which said heel-pieces will leave the whole of the horseshoe uncovered and effectively in contact with the ground and will leave the main body of the hoof open. Secondarily, it consists of a pair of such heel-pieces mounted upon separate strips of material which may be adjusted beneath the horseshoe and which being separate are mutually and relatively movable, and, tertiarily, it consists in a pair of said heel-pieces especially constructed to offer a yielding cushion at exactly proper and effective points beneath the frog and formed with integral wings or flanges and mounted upon separate strips of suitable material, which flanges and strips fit beneath the horseshoe and are secured by the usual horseshoe-nails, whereby to steady the heel-pieces and retain them in proper position.

In the accompanying drawings, forming part of this specification, in which like letters of reference designate corresponding parts in both views, Figure 1 is an inverted plan view of a pair of heel-pieces comprising my invention mounted in relation to the horseshoe which is indicated in dotted lines, and Fig. 2 is a rear elevation or edge view thereof.

In the practice of my invention I mold two separate pads or heel-pieces A, each of which is formed with a round or segmental outer edge A' and with an inner curve or approximately S-shaped edge $A^2$, whereby to form a rounded radially-projected portion $A^3$, which extends inwardly toward the frog, the rear faces of the pad following in general the line of the said frog, and forward of this portion the edge $A^2$ curves inwardly to form an increasingly narrow front portion $A^1$.

On the outside of each pad or heel-piece, extending from one end of the rounded outer edge $A^1$ to the other, is an integral outwardly-projecting flange B of relatively slight thickness, formed with a rounded outer edge $B^1$, outwardly flaring from the rear of the pad forwardly and turned or curved at its front outer corner $B^2$.

Each of the heel-pieces or pads A and its integral flange B is secured upon a strip of leather C, which follows the contour of the heel-piece and flange nearly to the front edge thereof, where it projects forwardly a slight distance beyond the same. These strips are not, however, of a length to reach the toe of the shoe and are separate one from the other. The under facings or treads of the heel-pieces A are roughened throughout the major portion of their area, as shown in Fig. 1, and somewhat within the edge or periphery thereof is formed a groove D, through which the pad is secured to the leather strip C by means of any suitable stitching. It will by reference to the drawings be understood that the pads are made in pairs respectively for the right and left sides of the hoof.

The operation of my invention will be readily understood from the foregoing description, taken in connection with the accompanying drawings, and the advantages resultant from the use thereof will be manifest to all who are skilled in the art to which it appertains. As the horseshoe is about to be applied to the hoof of the animal two of the pads are placed upon the hoof, with the strips C and the flanges B resting underneath the shoe, and the pads are moved forwardly and outwardly until the curved outer edges $A^1$ approximately coincide with the inner edges of the rear ends of the horseshoe, whereupon the usual nails are inserted through the shoe and through the strips C and the flange B beneath it. The pads being separate and mounted on separate strips may be mutually adjusted relatively to the shoe and will accord with any proper shape which the shoe is given in fitting it to the hoof. Frequently one side of a horseshoe is flared relatively to the other, which latter may be slightly inwardly directed or its end somewhat straightened. This frequently prevents the proper fitting or shaping of the horseshoe in cases where pads are used or it necessitates cutting away one side of the pad. Moreover, different widths of pads must in general at present be employed for various horses, or else either one pad must be made narrow enough for all shoes, which will with wide-hoofed horses leave spaces between the shoe and the pad at either side, making the pad operate practically only in the center of the hoof, which is quite contrary to what is desirable, or alternatively a needlessly wide or maximum size of pad must always be employed, thereby necessitating the cutting away and waste of the usual rubber in the case of relatively narrow shoes. By the use of my invention, however, these disadvantages are wholly overcome and all the different sizes of hoofs or varied shapes of shoes require but one size or form of my pad, and at the same time the supports or cushions thereof lie close against the inner edges of the shoe at the rear, immediately beneath the frog, where protection or cushioning is necessary. The whole hoof being open except at the portions where the heel-pieces project and those which the shoe covers, free circulation of air and water is thereby permitted, and the hoof may be stuffed at night and readily kept clean at all times. The flanges B steady the heel-pieces, and as the end of the horseshoe rests upon them closely against the outer edges of the heel-pieces and rests also upon the strips C the said heel-pieces will be held in sufficiently firm position.

Having thus fully described my invention, what I claim as new, and desire to secure by Letters Patent, is—

1. A hoof pad comprising rubber heel-pieces respectively formed for the right and left sides of the shoe, comprising rubber cushioning-bodies projecting inwardly of the hoof to protect the frog, and a pair of separate strips or backings therefor, the said heel-pieces being mounted upon the inner edges of the said strips whereby they may be adjusted to lie against the inner edges of the rear ends of the horseshoe with the strips beneath the same.

2. A hoof-pad comprising two separate rubber heel-pieces and respectively formed for the right and left sides of the shoe formed with segmental curved outer facings adapted to lie against the inner edges of the rear ends of the horseshoe and embodying a rubber cushion projecting radially from the ends of the shoe and provided with curved inner edges to form cushions flared at the rear end and gradually decreasing forwardly, the said heel-pieces being provided exteriorly with integral outwardly-projecting flanges forwardly flared or widened, said heel-pieces and flanges being secured to strips or backings, which with the said flanges project above the horseshoe.

3. A hoof-pad comprising two separate rubber heel-pieces respectively formed for the right and left sides of the shoe formed with segmentally-curved outer facings adapted to lie against the inner edges of the rear ends of the horseshoe and embodying rubber cushions projecting radially from the ends of the shoe and provided with curved inner edges to form cushions flared at the rear and gradually decreasing forwardly, the said heel-pieces being provided exteriorly with integral outwardly-projecting flanges forwardly flared or widened, said heel-pieces and flanges being secured individually to separate strips or backings which project slightly beyond the forward ends of the said heel-pieces and are adapted to be adjusted independently beneath the horseshoe, to bring the heel-pieces into contact or coincident with the inner edges of the rear ends of the horseshoe.

In testimony that I claim the foregoing as my invention I have signed my name, in presence of the subscribing witnesses, this 3d day of April, 1901.

JOHN ANSON BUCK.

Witnesses:
F. A. STEWART,
F. F. TELLER.